Figure 1:
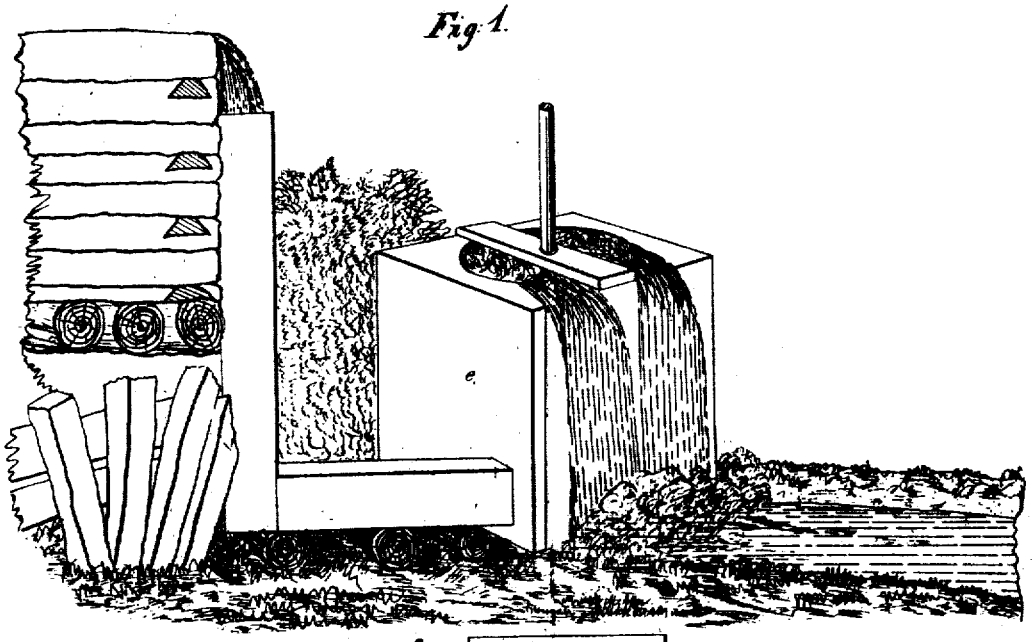
Figure 5:
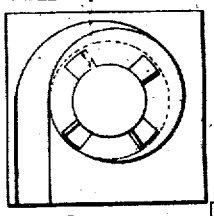
Figure 3:
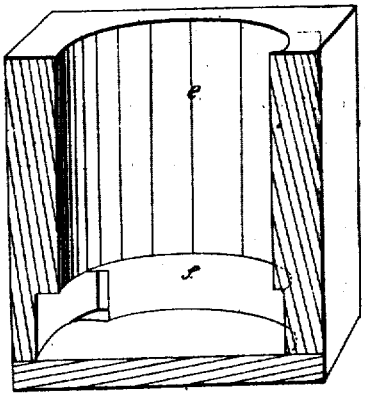
Figure 2:
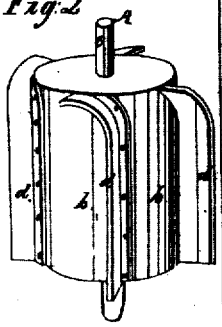
Figure 4:
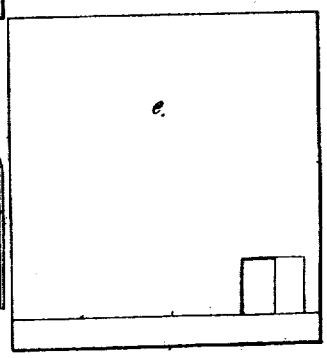

8808X

T. Pierce

Water Wheel,

Patented May 2, 1835.

9808X

May 2, 1835

Thomas Pierce of Hartwick Otsego County New York.

The schedule referred to in these Letters Patent and making part
of the same containing a description in the words of the said Thomas
Pierce himself, of his improvement in an inclined floated wheel
and a horizontal Rotary water Pitch for propelling the same.

---

To all persons to whom these presents may come.
Thomas Pierce of the Town of Hartwick county of Otsego and State
of New York sends greeting — Be it Known that I the said Thomas
Pierce — have invented a new and useful improvement not used or
known before in the making of a new Inclined Floated Wheel with a
horizontal Rotary Water Pitch for propelling the same — which invention
and the manner of using the same is as follows to wit. This improvement
in the Wheel and water Pitch is designed for the purpose of propelling
Cotton, and Woolen Manufactories. Common Grist and Saw Mills.
side Mills and all other machinery to which water power may be
applied. The application of which is to be made by bevel, cog. trundle.
banded or any other gearing. The wheel is to be made of cast iron and consists
in a Shaft hub or trunk. and floats or wings. and constructed in the
following manner. to wit. The Shaft is to be round the hub or trunk
may be cast solid with a hole corresponding with the diameter of the
lower extremity of the shaft through the centre of it, or in form of two
circular curbs or tubes solidly united at the bottom with a hollow or
groove between them, and is to be fastened to the Shaft by means of
wedges screws and nuts or bolts. The diameter of this hub or trunk
is to be about seven sixteenths of that of the inside of the tube (herein
after mentioned) within which the wheel is to be placed. The floats or
wings are to be fastened to one hub or trunk by means of an edge pro-
jecting from the side of the inner edge of the said floats or wings so
as to play into the hub or trunk, of sufficient width to fasten onto the
same by means of screws and nuts, bolts or rivets. The inclination or curve
of.

8088X of the floats or wings is to be so as to lean towards and over the water
pitch, so that the water in its rotary or circular motion in the tube will
have a full effect upon them. For operation the wheel is to be placed upright
in a circular tube and supported at the extremities in the usual
manner of upright wheels by Gudgeons or Pivots &c The tube is to be of
sufficient size in length and diameter to correspond with that of the
wheel, It is to be made tight at the bottom and may extend from the surface
of the water in the creek below the dam or at low tide to any depth necessary
for the purpose of increasing the head or the power of the water upon the wheel.
For the purpose of setting the tube, wheel, duct, and spout below the surface
of the water or ground as the case may be, or the location requires. it will be
necessary to sink a cask or box in the water or ground as aforesaid of
sufficient size in height and diameter to contain the tube, duct & spout.
The water is conducted down to the bottom of the tube in which the wheel
is placed in a spout from the flume, and taken from the side of the
spout at the bottom and carried in a duct lying horizontally and con-
tracting until it begins to enter the main cavity of the tube. The duct
continues horizontally around the tube in a rotary or circular direction
partly without and partly within the main cavity of the tube through which
the water passes in such a manner as to have an equal and continued
bearing on all the floats or wings in the wheel. and this rotary or circular
current and uniform bearing upon all the floats or wings in the wheel
is continued until the principal force of the water is exhausted in opera-
-ting upon the wheel. After which it passes in the rotary or circular manner
as aforesaid, off at the top of the tube. The spout duct and tube are also to
be made of cast iron. The whole or any part of the said wheel, tube duct
& spout may be made of wood or any other material. The following supposi-
-tion will serve more fully to exemplify the construction and operation
of this improvement to operate one run of Mill Stones. Suppose twelve feet
head of water. the shaft of the wheel should be about fourteen feet in
length and about two and a half inches in diameter, the hub or trunk
should be about twelve inches in length and seven inches in diameter
The The floats or wings should be about twelve inches in length and four
and a half inches in width making the wheel when put together about
sixteen inches in diameter. The wheel is to be placed in the tube as aforesaid.
the bottom of the tube. the duct and spout should be settled in the water or ground
as aforesaid about twelve feet. The duct when it enters the cavity of the
tube. should be about four inches square through which the water pass-
es aforesaid on to the wheel, the spout should be about eighteen inches in
diameter. The cog wheel on the water wheel shaft should be about the size
of that of the trundle-head on the spindle of the stone. Any part of the
supposed case above mentioned may be varied at pleasure, or there may
be attached to one wheel any number of runs of Stones or quantity of ma-
chinery. Or to one run of Stones to any one set of other machinery there may
be attached any number of wheels. For the purpose of gaining power
from the water wheel, when the head of .. water is sufficient. there
may be one wheel placed above another to any necessary number, joined
together by coupling-Gudgeons or gears as the case may require to operate
seperate machinery or all on one set or on one or more runs of Stones as
the case may be, the water operating in succession upon the several wheels.
For a more complete and explicit illustration of the last mentioned op-
eration, suppose thirty feet head of water. The water is taken down from
the surface of the water in the flume twenty feet in a spout to the
bottom of the tube in which the wheel is placed thence conducted through
a horizontal duct in at the bottom of the said tube. Then in its rotary
or circular operation on the wheel in the tube as aforesaid, it is elevated
ten feet. Then it operates on two more wheels in [illegible] like manner in suc-
cession. The water passes out at the top of the lowest tube as aforesaid
below the dam at the surface of the water or ground as the case may be.
In this operation there will be three wheels, each having twenty feet of
head water acting upon them in succession as aforesaid. The power
of the wheel may be increased by enlarging it in all its dimensions (increas-
ing the number of the floats or wings accordingly) and admitting into the
tube in which the wheel is placed an additional number of ducts which
will- 556 8088x will give to the water a rotary or circular motion as aforesaid successively upon the wheel. The size and dimensions of the wheel and number of floats or wings must be regulated according to the quantity &c of the machinery to be operated, the head and fall and quantity of water used. In all cases there should be a rack or Strainer at the head of the spout where the water is taken from the flume. This may be of cast iron or any other material. The aforesaid hub or trunk may be made in form of a drum or cylinder with heads at each end with holes through the center of them to slip into the shaft and fasten into the same as aforesaid by means of wedges &c. There should be a lip projected from the extremity of the head to which the cylinder is to be fastened by means of screws nuts bolts &c. The floats or wings are to be fastened to the cylinder by means of screws and nuts, bolts or rivets as aforesaid.

In witness whereof I have hereunto subscribed my name this twenty third day of July A.D. 1834

Witnesses
Alonzo Johnston
Dorcas Pierce.

Thomas Pierce.

Exd.
M.G.C.

1554

Patented 2d May 1835.

(Drawing)